(12) United States Patent
Li et al.

(10) Patent No.: US 12,154,381 B2
(45) Date of Patent: Nov. 26, 2024

(54) METHOD, DEVICE, ELECTRONIC EQUIPMENT AND STORAGE MEDIUM FOR POSITIONING MACULAR CENTER IN FUNDUS IMAGES

(71) Applicant: PING AN TECHNOLOGY (SHENZHEN) CO., LTD., Guangdong (CN)

(72) Inventors: Ge Li, Guangdong (CN); Rui Wang, Guangdong (CN); Lilong Wang, Guangdong (CN); Yijun Tang, Guangdong (CN); Meng Zhang, Guangdong (CN); Peng Gao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 458 days.

(21) Appl. No.: 17/620,733

(22) PCT Filed: May 29, 2020

(86) PCT No.: PCT/CN2020/093338
§ 371 (c)(1),
(2) Date: Dec. 19, 2021

(87) PCT Pub. No.: WO2021/068523
PCT Pub. Date: Apr. 15, 2021

(65) Prior Publication Data
US 2022/0415087 A1 Dec. 29, 2022

(30) Foreign Application Priority Data

Oct. 11, 2019 (CN) .......................... 201910964514.1

(51) Int. Cl.
*G06V 40/18* (2022.01)
*G06T 7/60* (2017.01)
(Continued)

(52) U.S. Cl.
CPC ................ *G06V 40/18* (2022.01); *G06T 7/60* (2013.01); *G06T 7/73* (2017.01); *G06V 10/774* (2022.01);
(Continued)

(58) Field of Classification Search
CPC . G06T 2207/30004; G06T 2207/30041; G06T 2207/20084; G06T 2207/20081;
(Continued)

(56) References Cited

U.S. PATENT DOCUMENTS 9,462,945 B1 * 10/2016 Barriga ................ A61B 3/152
10,413,180 B1 * 9/2019 Barriga ................ A61B 3/0033
(Continued)

FOREIGN PATENT DOCUMENTS

CN 109977905 A * 7/2019 ........... A61B 3/0025
WO WO-2019083129 A1 * 5/2019 ............... A61B 3/12

*Primary Examiner* — John Villecco
*Assistant Examiner* — Alexander John Rogers

(57) ABSTRACT

The application relates to the technical field of artificial intelligence, and provides a method, device, electronic equipment and storage medium for positioning macular center in fundus images. The method comprises: acquiring a detection result of the fundus image detection model, wherein the detection result includes an optic disc area, and a first detection block and a first confidence score corresponding to the optic disc area, and a macular area, and a second detection block and a second confidence score corresponding to the macular area; calculating a center point coordinate of the optic disc area according to the first detection block, and calculating a center point coordinate of the macular area according to the second detection block;

(Continued)

identifying whether the to-be-detected fundus image is a left eye fundus image or a right eye fundus image, and correcting a center point of the macular area using different correction models.

19 Claims, 3 Drawing Sheets

(51) Int. Cl.
*G06T 7/73* (2017.01)
*G06V 10/774* (2022.01)
*G06V 10/776* (2022.01)
*G06V 10/82* (2022.01)
*G06V 10/98* (2022.01)

(52) U.S. Cl.
CPC ............ *G06V 10/776* (2022.01); *G06V 10/82* (2022.01); *G06V 10/98* (2022.01); *G06T 2207/20081* (2013.01); *G06T 2207/20084* (2013.01); *G06T 2207/30041* (2013.01); *G06V 2201/03* (2022.01)

(58) Field of Classification Search
CPC .... G06T 7/60; G06V 2201/03; G06V 10/776; G06V 10/774; G06V 10/98
See application file for complete search history.

(56) References Cited

U.S. PATENT DOCUMENTS

| | | | |
|---|---|---|---|
| 11,093,742 B1* | 8/2021 | Wakeford | G06V 10/82 |
| 2010/0061601 A1* | 3/2010 | Abramoff | G06T 7/33 |
| | | | 382/117 |
| 2014/0276025 A1* | 9/2014 | Durbin | A61B 3/0025 |
| | | | 600/407 |
| 2016/0345819 A1* | 12/2016 | Jayasundera | G06T 7/12 |
| 2017/0112372 A1* | 4/2017 | Chakravorty | A61B 3/14 |
| 2017/0270653 A1* | 9/2017 | Garnavi | G06N 5/01 |
| 2020/0000331 A1* | 1/2020 | Chakravorty | G06V 40/193 |

* cited by examiner

METHOD, DEVICE, ELECTRONIC EQUIPMENT AND STORAGE MEDIUM FOR POSITIONING MACULAR CENTER IN FUNDUS IMAGES

The present application claims the benefit of Chinese patent application filed with China Patent Office on Oct. 11, 2019, with the application number of No. 201910964514.1 and the title of "Method, device, electronic equipment and storage medium for positioning macular center in fundus images".

TECHNICAL FIELD

The application relates to the technical field of medical image processing based on artificial intelligence, in particular to a method, device, electronic equipment and storage medium for positioning macular center in fundus images.

BACKGROUND

A large number of visual functional cells are concentrated in the macula. If macular lesions are not found and treated in time, the probability of blindness would be greatly increased. Therefore, accurate location of macular center is of great significance to the diagnosis of retinopathy. In the prior art, there is a method for positioning macular center based on fundus images, which firstly positions the optic disc center and then positions the macular center according to the optic disc center; or use a target detection model of deep neural network to directly detect the macular area.

The inventor realized that the existing method for positioning macular center based on fundus images completely depends on the positioning of the optic disc center, and once the optic disc center positioning fails, the macular center cannot be effectively positioned. And the method has high computational complexity, poor timeliness and poor robustness. Although the method of macular center location based on deep neural network does not depend on the optic disc center positioning, because the macular detection is easily affected by image quality, occlusion of lesion area and atrophy area, the macular area would not be successfully detected or further be effectively located. Therefore, it is necessary to propose a new method for positioning macular center in fundus images, which does not completely depend on the optic disc center positioning, and can effectively locate the macular center when the macular area is blocked or the fundus image quality is poor.

SUMMARY

In view of the above, it is necessary to propose a method, device, electronic equipment and storage medium for positioning macular center in fundus images, which can effectively locate the macular center without completely depending on the optic disc center positioning even when the macular area is blocked or the fundus image quality is poor.

A method for positioning macular center in fundus images, including:
inputting a to-be-detected fundus image into a pre-trained fundus image detection model;
acquiring a detection result of the fundus image detection model, wherein the detection result includes an optic disc area, and a first detection block and a first confidence score corresponding to the optic disc area, and a macular area, and a second detection block and a second confidence score corresponding to the macular area in a fundus image;
calculating a center point coordinate of the optic disc area according to the first detection block, and calculating a center point coordinate of the macular area according to the second detection block;
comparing the second confidence score with a preset first confidence threshold and a preset second confidence threshold, wherein the preset first confidence threshold is greater than the preset second confidence threshold;
if the second confidence score is less than the preset second confidence threshold, identifying whether the to-be-detected fundus image is a left eye fundus image or a right eye fundus image using a pre-trained left and right eye recognition model;
correcting a center point of the macular area using different correction models for the left eye fundus image and the right eye fundus image.

A device for positioning macular center in fundus images, including:
an input module, configured to input a to-be-detected fundus image into a pre-trained fundus image detection model;
an acquisition module, configured to acquire a detection result of the fundus image detection model, wherein the detection result includes an optic disc area, and a first detection block and a first confidence score corresponding to the optic disc area, and a macular area, and a second detection block and a second confidence score corresponding to the macular area in a fundus image;
a calculation module, configured to calculate a center point coordinate of the optic disc area according to the first detection block, and calculate a center point coordinate of the macular area according to the second detection block;
a comparison module, configured to compare the second confidence score with a preset first confidence threshold and a preset second confidence threshold, wherein the preset first confidence threshold is greater than the preset second confidence threshold;
an identification module, configured to, if the second confidence score is less than the preset second confidence threshold, identify whether the to-be-detected fundus image is a left eye fundus image or a right eye fundus image using a pre-trained left and right eye recognition model;
a correction module, configured to correct a center point of the macular area using different correction models for the left eye fundus image and the right eye fundus image.

An electronic equipment, includes a processor for executing computer readable instructions stored in a memory to implement following steps:
inputting a to-be-detected fundus image into a pre-trained fundus image detection model;
acquiring a detection result of the fundus image detection model, wherein the detection result includes an optic disc area, and a first detection block and a first confidence score corresponding to the optic disc area, and a macular area, and a second detection block and a second confidence score corresponding to the macular area in a fundus image;
calculating a center point coordinate of the optic disc area according to the first detection block, and calculating a center point coordinate of the macular area according to the second detection block;

comparing the second confidence score with a preset first confidence threshold and a preset second confidence threshold, wherein the preset first confidence threshold is greater than the preset second confidence threshold;

if the second confidence score is less than the preset second confidence threshold, identifying whether the to-be-detected fundus image is a left eye fundus image or a right eye fundus image using a pre-trained left and right eye recognition model;

correcting a center point of the macular area using different correction models for the left eye fundus image and the right eye fundus image.

One or more readable storage mediums storing computer readable instructions, wherein the computer readable instructions, when executed by one or more processors, cause the one or more processors to implement following steps:

inputting a to-be-detected fundus image into a pre-trained fundus image detection model;

acquiring a detection result of the fundus image detection model, wherein the detection result includes an optic disc area, and a first detection block and a first confidence score corresponding to the optic disc area, and a macular area, and a second detection block and a second confidence score corresponding to the macular area in a fundus image;

calculating a center point coordinate of the optic disc area according to the first detection block, and calculating a center point coordinate of the macular area according to the second detection block;

comparing the second confidence score with a preset first confidence threshold and a preset second confidence threshold, wherein the preset first confidence threshold is greater than the preset second confidence threshold;

if the second confidence score is less than the preset second confidence threshold, identifying whether the to-be-detected fundus image is a left eye fundus image or a right eye fundus image using a pre-trained left and right eye recognition model;

correcting a center point of the macular area using different correction models for the left eye fundus image and the right eye fundus image.

According to the method, device, electronic equipment and storage medium for positioning macular center in fundus images, the detection block of optic disc area and macular area in the to-be-detected fundus images and the confidence score of corresponding detection block are output through fundus image detection model. Then the center point coordinates of the optic disc area and the macular area are calculated according to the detection block. And finally, according to the corresponding relationship between the macular area and the optic disc area of the left and right eyes, the optic disc center is used for correcting the fundus image of the undetected macular area and the macular area with low confidence score. Even if the macular area is blocked or the fundus image quality is poor, the center of macular area can still be located effectively. The above solves the problem that the detection of macular area fails due to poor image quality, or the image being blocked by lesions and the like, and breaks away from the dependence of the conventional method for positioning macular center on the optic disc center positioning.

DETAILED DESCRIPTION

In order to illustrate the above objects, features and advantages of the application more clearly, the application will be described in detail with reference to the drawings and specific embodiments. It should be noted that the embodiments of this application and the features in the embodiments can be combined with each other without conflict.

In the following description, many specific details are set forth for fully understanding of the application. And the described embodiments are part of the embodiments of the application, not all of them. Based on the embodiments in the present application, all other embodiments obtained by those skilled in the art without creative effort fall in the protection scope of the application.

Unless otherwise defined, all scientific and technical terms used herein have the same meanings as those commonly understood by those skilled in the art. Terms used in the specification of this application are only for the purpose of describing specific embodiments, and are not intended to limit the application.

Preferably, the method for positioning macular center in fundus images of the present application is applied in one or more electronic equipments. The electronic equipment can automatically perform numerical calculation and/or information processing according to preset or stored instructions. And its hardware includes but is not limited to microprocessor, Application Specific Integrated Circuit (ASIC), Field-Programmable Gate Array (FPGA), Digital Signal Processor (DSP), embedded equipment, etc.

The electronic equipment may be a desktop computer, a notebook computer, a palm computer, a cloud server or other computing devices. The electronic equipment can perform man-machine interaction with a user through a keyboard, mouse, remote controller, touch panel or voice control device.

Embodiment 1

Figure 1:
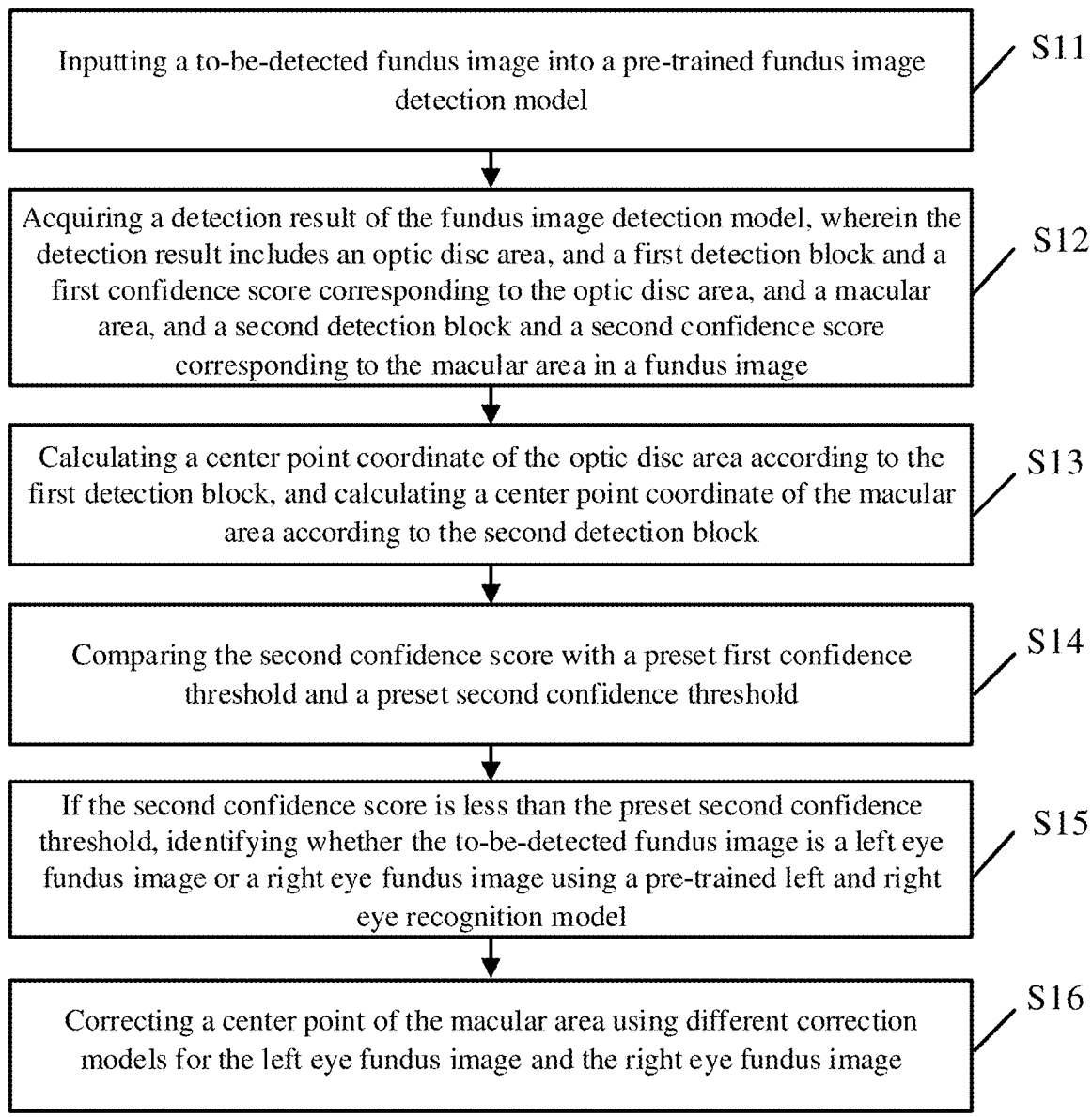
FIG. 1 is a flow diagram of a method for positioning macular center in fundus images according to an embodiment of the present application.

FIG. 1 is a flow diagram of a method for positioning macular center in fundus images according to an embodiment of the present application. According to different requirements, the implementation order in the flow diagram may be changed, and some steps may be omitted.

S11: inputting a to-be-detected fundus image into a pre-trained fundus image detection model.

Fundus images are images taken by eye detection equipment for diagnosing eye diseases. Fundus refers to the tissues in the inner and rear part of eyeball, including retina, optic papilla, macula and central retinal artery and vein. Therefore, the to-be-detected fundus image includes the macula and the macular area formed around it, and the retina and the optic disc area formed around it.

The fundus image detection model is trained by using sample images where the feature area is known. The input is a fundus image and the output is a fundus image marked with feature area. The feature area is at least one of a optic disc area and a macular area.

In an optional embodiment, before the step of S11 (Inputting a to-be-detected fundus image into a pre-trained fundus image detection model), the method further includes:

Training the fundus image detection model.

The fundus image detection model is obtained by training the depth neural network with a large amount of sample data, so that after the unmarked fundus image is input into the fundus image detection model, the fundus image detection model would output the fundus image marked with one or more feature areas.

According to a preferred embodiment of the present application, the training process of the fundus image detection model includes:

acquiring a plurality of fundus images;
marking one or more feature areas in each fundus image, wherein the feature areas are macular area and optic disc area;
building a sample data set based on the fundus image marked with one or more feature areas and categories of the corresponding feature areas;
dividing randomly the sample data set into a first number of training sets and a second number of test sets;
inputting the training set into Mask RCNN network for training to obtain a fundus image detection model;
inputting the test set into the fundus image detection model for testing to obtain a test pass rate;
determining whether that test pass rate is greater than a preset pass rate threshold;
if the test pass rate is greater than or equal to the preset pass rate threshold, ending the training of the fundus image detection model; if the test pass rate is less than the preset pass rate threshold, increasing the number of training sets, and training Mask RCNN network based on the increased number of training sets until the test pass rate is greater than or equal to the preset pass rate threshold.

The fundus images may include left eye fundus images or right eye fundus images of healthy people and patients with eye diseases. The feature area in the fundus image can be identified and marked by manual or other automatic identification methods. And the marked content may be any one or more of macular area and optic disc area.

For example, suppose that 100,000 fundus images are acquired, mark any one or more of macular area and optic disc area in these 100,000 fundus images, take fundus images marked with one or more feature areas as a data set, and then divide the data set into a training set and a test set. The number of fundus images marked with one or more feature areas in the training set is larger than that of fundus images marked with one or more feature areas in the test set, e.g., 80% of the fundus images marked with one or more feature areas are put in the training set, and the remaining 20% are put in the test set. Mask RCNN network is selected as the prototype of fundus image detection model, default input parameters are adopted when initializing Mask RCNN network, and the input parameters are constantly adjusted in the process of training. After training to generate a fundus image detection model, fundus images in the test set are used to verify the trained fundus image detection model. If the test pass rate is less than a preset pass rate threshold, e.g., the pass rate is less than 98%, increase the number of fundus images participating in the training and retrain the Mask RCNN network until the test pass rate of the trained fundus image detection model is greater than or equal to the preset pass rate threshold.

The Mask RCNN network is a prior art, which will not be elaborated in detail here.

According to a preferred embodiment of the present application, after acquiring a plurality of fundus images, the method further includes:

rotating the fundus image at a predetermined angle;
marking one or more feature areas in the fundus image after rotation;
the step of building a sample data set based on the fundus image marked with one or more feature areas and categories of the corresponding feature areas includes:
building a first sample data set based on the fundus image marked with one or more feature areas and categories of the corresponding feature areas, and building a second sample data set based on the rotated fundus image marked with one or more feature areas and categories of the corresponding feature areas; and taking the first sample data set and the second sample data set as the sample data set.

The rotating process includes random rotating, mirror rotating, horizontal rotating, etc. For example, the rotation angle may be from −15 degrees to +15 degrees.

The initial data set includes a first data set and a second data set, wherein the first data set is a fundus image shot and marked by an eye detection equipment, and the second data set is obtained through processing the first data set, such as rotating or mirroring. In this way, the fundus images in the first data set are expanded to achieve the purpose of supplementing the fundus images. Training the fundus image detection model based on a larger number of data sets can improve the detection accuracy and generalization performance of the fundus image detection model.

In an optional embodiment, in order to improve the detection rate of the fundus image detection model, the method further includes:

improving the network structure of Mask RCNN.

Figure 2:
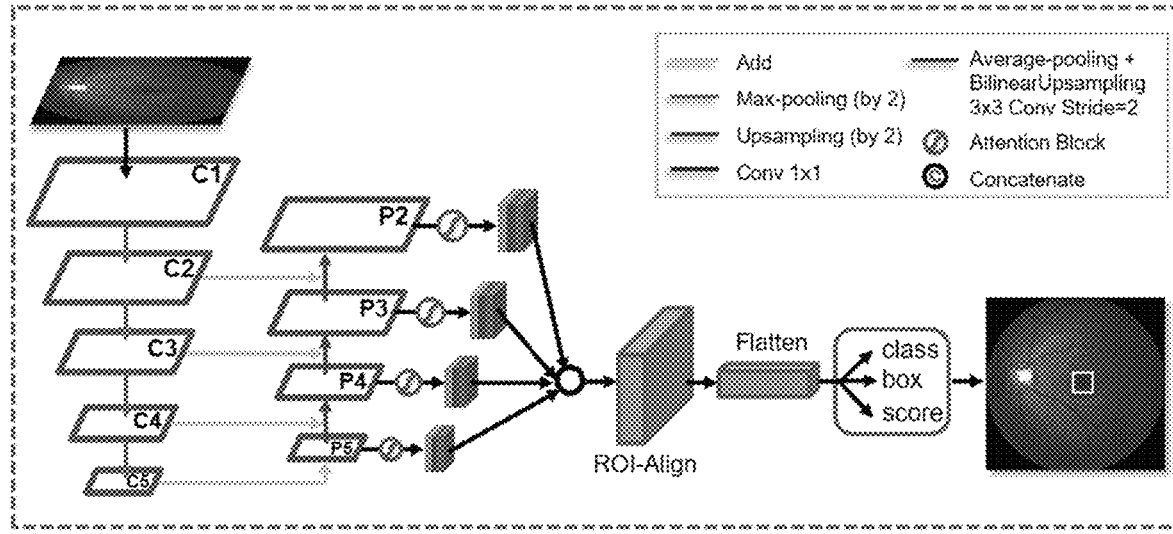
FIG. 2 is a schematic diagram of a network structure of Mask RCNN network according to an embodiment of the present application.

The network structure of the improved Mask RCNN network is shown in FIG. 2.

According to a preferred embodiment of the present application, the network structure of Mask RCNN network includes:

1) Multilayer backbone networks, each layer of backbone networks adopts MobileNet V2 network.

Each layer of backbone network is used for extracting the features of the input fundus image, and has a top-down structure, and performs down-sampling processing layer by layer.

For example, as shown in the figure, suppose that a fundus image F0 of 1024*1024 is input, and the first layer of backbone network C1 performs feature extraction on the input fundus image F0, and outputs a feature map F1 of 256*256 to the second layer of backbone network C2. The second layer of backbone network C2 performs feature extraction on the input feature map F1, and outputs a feature map F2 of 128*128 to the third layer of backbone network C3. The third layer of backbone network C3 performs feature extraction on the input feature map F2, and outputs a feature map F3 of 64*64 to the fourth layer of backbone network C4, and so on. The size of the feature map output by the upper layer of backbone network is twice that of the feature map output by the next layer of backbone network.

2) Multilayer feature pyramid networks, an input of upper layer of feature pyramid networks is a sum of an output of next layer of feature pyramid networks and an output of the backbone network at the same layer as the upper layer of feature pyramid network.

The Feature Pyramid Networks (FPN) is used to predict the feature map of each layer, which is a bottom-up structure and performs up-sampling processing layer by layer.

Illustratively, as shown in the figure, the input of the fifth layer of feature pyramid network P5 is the input of the backbone network of the same layer as the fifth layer (equivalent to performing a 1×1 convolution). The input of the fourth layer of feature pyramid network P4 is the sum of the output of the fifth layer of feature pyramid network P5 and the output of the backbone network C4 (fourth layer of backbone network) of the same layer as the fourth layer. The input of the third layer of feature pyramid network P3 is the sum of the output of the fourth layer of feature pyramid network P4 and the output of the backbone network C3 (third layer of backbone network) of the same layer as the third layer, and so on.

3) Attention layer.

The Attention Block layer enables the feature extraction capability of the network to focus more on the optic disc area and macular area and reduce the noise introduced by other areas.

4) Pooling layer.

In this layer, RoIAlign operation is performed on the stride corresponding to the feature maps obtained from [P2 P3 P4 P5] and four different scales of attention layer to generate RoI, so as to obtain a proposal feature map with fixed size, which is input to fully connected layer for target detection and location.

5) Full connected layer.

This layer connects (Concat) the proposal feature map output by pooling layer, and then the network is divided into three parts: full-connected prediction class (class), full-connected prediction rectangle box (box), and full-connected prediction confidence score (score).

6) Output layer.

This layer is used to output three values, namely, the class of feature area in fundus image, the detection block of feature area in fundus image and the confidence score of the detection block. The feature area is any one or more of optic disc area and macular area.

In this alternative embodiment, Mask RCNN is improved, and the lightweight Mobile Net V2 network is adopted as the backbone network, which reduces the calculation amount of network parameters and can improve the detection speed of the fundus image detection model. In addition, the attention layer is added after the layer of feature pyramid network, which enables the feature extraction capability of the network focus more on the optic disc area and macular area, thus further improving the detection speed and accuracy of the fundus image detection model.

S12: acquiring a detection result of the fundus image detection model, wherein the detection result includes an optic disc area, and a first detection block and a first confidence score corresponding to the optic disc area, and a macular area, and a second detection block and a second confidence score corresponding to the macular area in a fundus image.

The fundus image detection model outputs a fundus image marked with feature area. That is, the output is a fundus image in which the macular area and/or the optic disc area are marked with a detection block.

The confidence score is used to indicate the accuracy of the feature area detected by the fundus image detection model, and the value range is 0-1.

According to the experimental statistics, when using the trained fundus image detection model to process any fundus image, for most of the fundus images, for example, 80%, the fundus image detection model can accurately output the fundus image marked with the optic disc area, that is, it can accurately mark the position of the optic disc area with the detection block, and the obtained confidence score is also high. The macular area may or may not be marked in the output fundus image. However, due to the fact that the macular area is prone to pathological changes or occlusion, the macular area detected by the fundus image detection model may have errors, and the corresponding confidence score may be high or low. If the fundus image output by the fundus image detection model is directly marked with macular area and has high confidence score, it can be directly used as the result. If the fundus image output by the fundus image detection model is marked with macular area but the confidence score is low, or the output fundus image is not marked with macular area, the position of macular area can be corrected according to the position of optic disc area.

It should be noted that the outline of the detection block is rectangular, which is determined by the sample data in the training process of the fundus image detection model. If the shape marked in the sample data is changed during the training process, for example, circular or irregular shapes, the trained fundus image detection model will also be marked with corresponding shapes, thus outputting the outline of corresponding shapes.

S13: calculating a center point coordinate of the optic disc area according to the first detection block, and calculating a center point coordinate of the macular area according to the second detection block.

After the fundus image detection model outputs the fundus image marked with feature area, the detection block of the optic disc area and the detection block of the macular area can be obtained from the fundus image marked with feature area.

The XOY coordinate system is established with the upper left corner of the fundus image marked with feature area as the origin, the upper border line as X axis and the left border line as Y axis. And then first coordinates of the vertexes of the detection block of the optic disc area and second coordinates of the vertexes of the detection block of the macular area in the XOY coordinate system are obtained.

The center point coordinate of the optic disc area can be calculated according to a plurality of the first coordinates. And the center point coordinate of the macular area can be calculated according to a plurality of the second coordinates.

For example, assuming that the first coordinates of the vertexes of the detection block of the optic disc area are (a, b),(c,b),(a,d),(c,d), then the center point coordinate of the optic disc area is $$\left(\frac{a+c}{2}, \frac{b+d}{2}\right).$$

Assuming that the second coordinates of the vertexes of the detection block of the macular area are (s,t), (m,t),(s,n), (m,n), then the center point coordinate of the macular area is $$\left(\frac{s+m}{2}, \frac{t+n}{2}\right).$$

S14: comparing the second confidence score with a preset first confidence threshold and a preset second confidence threshold.

The preset first confidence threshold and the preset second confidence threshold are both critical values preset for judging the accuracy of the detection block of the macular area. The preset first confidence threshold is greater than the preset second confidence threshold.

S15: if the second confidence score is less than the preset second confidence threshold, identifying whether the to-be-detected fundus image is a left eye fundus image or a right eye fundus image using a pre-trained left and right eye recognition model.

The left and right eye recognition model may be trained in advance offline.

The specific training process is as follows: collecting a plurality of fundus images, marking each fundus image to indicate that the fundus image is a left eye fundus image or a right eye fundus image, taking the fundus images and corresponding marks as a data set, then dividing the data set into a training set and a test set, wherein the number of training sets is greater than the number of test sets, and training deep neural networks such as convolutional neural networks based on the training set to obtain a left and right eye recognition model. And then testing the test pass rate of the trained left and right eye recognition model based on the test set, outputting the left and right eye recognition model when the test pass rate is greater than or equal to the preset pass rate threshold. And redividing the training set and the test set and training the left and right eye recognition model based on the new training set until the test pass rate is greater than or equal to the preset pass rate threshold.

The relative positions of the macular area and optic disc area are different between left eye fundus image and right eye fundus image. In the left eye fundus image, the optic disc area is on the left, the macular area is on the right, and the macular area is on the right side of the optic disc area. In the right eye fundus image, the optic disc area is on the right, the macula area is on the left, and the macula area is on the left side of the optic disc area.

Therefore, when the second confidence score is less than the preset first confidence threshold, it indicates that the confidence score of the macular area detected by the fundus image detection model is very low, or the macular area is not detected. In this case, it needs to further identify whether the to-be-detected fundus image is a left eye fundus image or a right eye fundus image, and then adopt different correction methods to correct the detection block of the macular area, and then correct the center point of the macular area.

S16: correcting a center point of the macular area using different correction models for the left eye fundus image and the right eye fundus image.

The step of correcting a center point of the macular area using different correction models for the left eye fundus image and the right eye fundus image includes:

correcting the center point of the macular area using a first correction model and the center point coordinate of the optic disc area for the left eye fundus image, and the first correction model is as follows:

$$x_{fovea} = \begin{cases} x_{oc} + \sqrt{(2.42*h)^2 - (y_{fovea} - y_{oc})^2}, \text{others} \\ x_{oc} + 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

correcting the center point of the macular area using a second correction model and the center point coordinate of the optic disc area for the right eye fundus image, and the second correction model is as follows:

$$x_{fovea} = \begin{cases} x_{oc} - \sqrt{(2.42*h)^2 - (y_{fovea} - y_{oc})^2}, \text{others} \\ x_{oc} - 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

wherein, W represents a width of the to-be-detected fundus image, H represents a height of the to-be-detected fundus image, $(x_{oc}, y_{oc})$ is calculated center point coordinate of the optic disc area, h is a height of the first detection block corresponding to the optic disc area, and $(x_{fovea}, y_{fovea})$ is corrected center point coordinate of the macular area.

According to a preferred embodiment of the present application, the method includes:

if the second confidence score is less than the preset first confidence threshold and greater than the preset second confidence threshold, correcting the center point of the macular area using a third correction model and the center point coordinate of the optic disc area, and the third correction model is as follows:

$$x_{fc}=0.5*x_{dc}+0.5*x_{fovea},$$

$$y_{fc}=0.5*y_{dc}+0.5*y_{fovea},$$

wherein, $(x_{fc}, y_{fc})$ is final corrected center point coordinate of the macular area, $(x_{dc}, y_{dc})$ is calculated center point coordinate of the macular area, $(x_{fovea}, y_{fovea})$ is center point coordinate of the macular area corrected according to the center point coordinate of the optic disc area.

When the second confidence score is between the preset first confidence threshold and the preset second confidence threshold, it indicates that the fundus image detection model has detected the macular area, but the confidence score of the detected macular area is not high, and the accuracy of the detection block of the marked macular area is not high, so it is necessary to correct the detection block of the macular area and further correct the center point of the macular area.

According to a preferred embodiment of the present application, the method includes:

if the second confidence score is greater than the preset first confidence threshold, taking the center point coordinate of the macular area calculated according to the second detection block as a final center point coordinate of the macular area.

If the macular area is detected by the fundus image detection model, and the confidence score corresponding to the macular area is high (greater than the preset first confidence threshold), it is considered that the macular area detected by the fundus image detection model is good, and there is no need for the fundus image detection model to detect the optic disc area. Only when the fundus image detection model can't detect the macular area, or when the macular area is detected but the confidence score corresponding to the macular area is low (less than the preset first confidence threshold), the macular area needs to be corrected according to the detection result of the optic disc area. Therefore, by adopting the above technical solution, the dependency on the optic disc area can be reduced to a certain extent.

It should be noted that 0.3, 0.7, 2.42, 0.39 and 0.5 in the above formula are obtained through a large number of experimental studies.

To sum up, according to the method for positioning macular center in fundus images, the fundus image detection model is obtained by training based on Mask RCNN network, and detection block of the optic disc area and detection block of the macular area in the to-be-detected fundus image and the confidence score of the corresponding detection block are output by the fundus image detection model. Then the center point coordinates of the optic disc area and the macular area are calculated according to the detection block. And finally, according to the corresponding relationship between the macular area and the optic disc area of the left and right eyes, the optic disc center is used for correcting the fundus image of the undetected macular area and the macular area with low confidence score. Even if the macular area is blocked or the fundus image quality is poor, the center of macular area can still be located effectively. The above solves the problem that the detection of macular area fails due to poor image quality, or the image being blocked by lesions and the like. Furthermore, the fundus image detection model detects the macular area and the optic disc area separately, so that the macular center can still be effectively located even if the optic disc area is missing in the fundus image, thereby breaking away from the dependence of the conventional method for positioning macular center on the optic disc center positioning.

In addition, by changing the structure of Mask RCNN network, the calculation amount of network parameters is reduced, the detection speed of fundus image detection model is improved, and the timeliness of macular center positioning is improved. The attention layer is added after the feature pyramid network, which enables the feature extraction capability of the network focus more on the optic disc area and macular area, further improving the detection speed and accuracy of fundus image detection model, and helping to improve the positioning of macular center.

Embodiment 2

Figure 3:
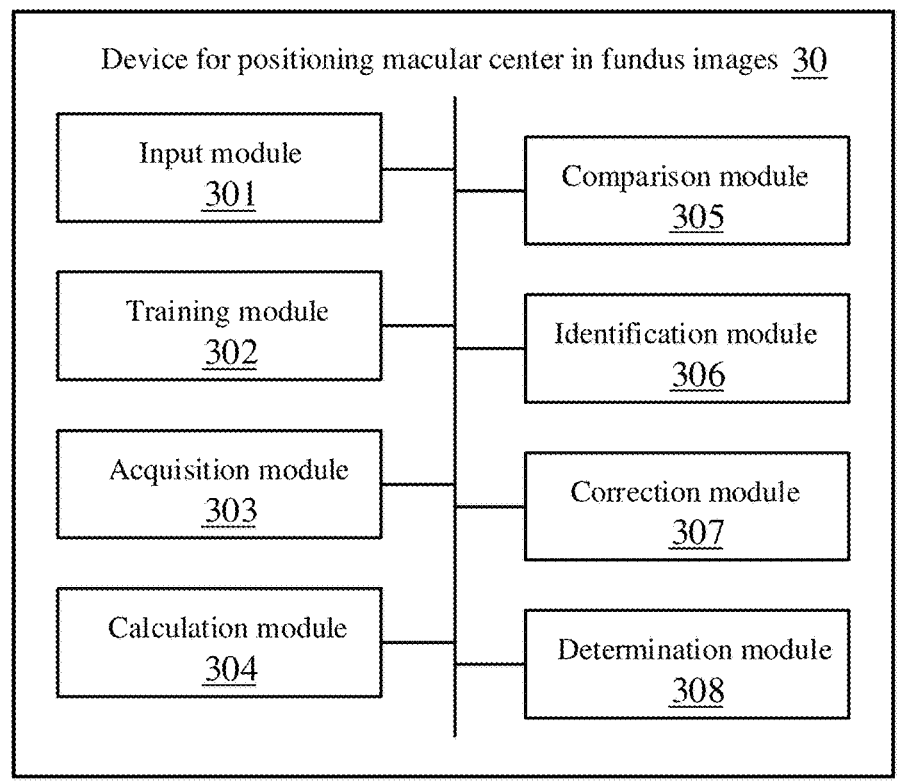
FIG. 3 is a structural diagram of a device for positioning macular center in fundus images according to an embodiment of the present application.

FIG. 3 is a structural diagram of a device for positioning macular center in fundus images according to embodiment 2 of the present application.

The device for positioning macular center in fundus images 30 runs in an electronic equipment, which can solve the problem that the detection of macular area fails due to poor image quality, or the image being blocked by lesions and the like, and breaks away from the dependence of the conventional method for positioning macular center on the optic disc center positioning. As shown in FIG. 3, the device for positioning macular center in fundus images 30 may include an input module 301, a training module 302, an acquisition module 303, a calculation module 304, a comparison module 305, an identification module 306, a correction module 307 and a determination module 308.

An input module 301, configured to input a to-be-detected fundus image into a pre-trained fundus image detection model.

Fundus images are images taken by eye detection equipment for diagnosing eye diseases. Fundus refers to the tissues in the inner and rear part of eyeball, including retina, optic papilla, macula and central retinal artery and vein. Therefore, the to-be-detected fundus image includes the macula and the macular area formed around it, and the retina and the optic disc area formed around it.

The fundus image detection model is trained by using sample images where the feature area is known. The input is a fundus image and the output is a fundus image marked with feature area. The feature area is at least one of an optic disc area and a macular area.

In an optional embodiment, before the input module 301 inputs a to-be-detected fundus image into a pre-trained fundus image detection model, the device for positioning macular center in fundus images 30 further includes:

A training module 302, configured to train the fundus image detection model.

The fundus image detection model is obtained by training the depth neural network with a large amount of sample data, so that after the unmarked fundus image is input into the fundus image detection model, the fundus image detection model would output the fundus image marked with one or more feature areas.

According to a preferred embodiment of the present application, the process of the training module 302 training the fundus image detection model includes:

acquiring a plurality of fundus images;

marking one or more feature areas in each fundus image, wherein the feature areas are macular area and optic disc area;

building a sample data set based on the fundus image marked with one or more feature areas and categories of the corresponding feature areas;

dividing randomly the sample data set into a first number of training sets and a second number of test sets;

inputting the training set into Mask RCNN network for training to obtain a fundus image detection model;

inputting the test set into the fundus image detection model for testing to obtain a test pass rate;

determining whether that test pass rate is greater than a preset pass rate threshold;

if the test pass rate is greater than or equal to the preset pass rate threshold, ending the training of the fundus image detection model; if the test pass rate is less than the preset pass rate threshold, increasing the number of training sets, and training Mask RCNN network based on the increased number of training sets until the test pass rate is greater than or equal to the preset pass rate threshold.

The fundus images may include left eye fundus images or right eye fundus images of healthy people and patients with eye diseases. The feature area in the fundus image can be identified and marked by manual or other automatic identification methods. And the marked content may be any one or more of macular area and optic disc area.

For example, suppose that 100,000 fundus images are acquired, mark any one or more of macular area and optic disc area in these 100,000 fundus images, take fundus images marked with one or more feature areas as a data set, and then divide the data set into a training set and a test set. The number of fundus images marked with one or more feature areas in the training set is larger than that of fundus images marked with one or more feature areas in the test set, e.g., 80% of the fundus images marked with one or more feature areas are put in the training set, and the remaining 20% are put in the test set. Mask RCNN network is selected as the prototype of fundus image detection model, default input parameters are adopted when initializing Mask RCNN network, and the input parameters are constantly adjusted in the process of training. After training to generate a fundus image detection model, fundus images in the test set are used to verify the trained fundus image detection model. If the test pass rate is less than a preset pass rate threshold, e.g., the pass rate is less than 98%, increase the number of fundus images participating in the training and retrain the Mask RCNN network until the test pass rate of the trained fundus image detection model is greater than or equal to the preset pass rate threshold.

The Mask RCNN network is a prior art, which will not be elaborated in detail here.

According to a preferred embodiment of the present application, after acquiring a plurality of fundus images, the method further includes:

rotating the fundus image at a predetermined angle;

marking one or more feature areas in the fundus image after rotation;

the step of building a sample data set based on the fundus image marked with one or more feature areas and categories of the corresponding feature areas includes: building a first sample data set based on the fundus image marked with one or more feature areas and categories of the corresponding feature areas, and building a second sample data set based on the rotated fundus image marked with one or more feature areas and categories of the corresponding feature areas; and taking the first sample data set and the second sample data set as the sample data set.

The rotating process includes random rotating, mirror rotating, horizontal rotating, etc. For example, the rotation angle may be from −15 degrees to +15 degrees.

The initial data set includes a first data set and a second data set, wherein the first data set is a fundus image shot and marked by an eye detection equipment, and the second data set is obtained through processing the first data set, such as rotating or mirroring. In this way, the fundus images in the first data set are expanded to achieve the purpose of supplementing the fundus images. Training the fundus image detection model based on a larger number of data sets can improve the detection accuracy and generalization performance of the fundus image detection model.

In an optional embodiment, in order to improve the detection rate of the fundus image detection model, the device for positioning macular center in fundus images 30 further includes:

improving the network structure of Mask RCNN.

The network structure of the improved Mask RCNN network is shown in FIG. 2.

According to a preferred embodiment of the present application, the network structure of Mask RCNN network includes:

1) Multilayer backbone networks, each layer of backbone networks adopts MobileNet V2 network.

Each layer of backbone network is used for extracting the features of the input fundus image, and has a top-down structure, and performs down-sampling processing layer by layer.

For example, as shown in the figure, suppose that a fundus image F0 of 1024*1024 is input, and the first layer of backbone network C1 performs feature extraction on the input fundus image F0, and outputs a feature map F1 of 256*256 to the second layer of backbone network C2. The second layer of backbone network C2 performs feature extraction on the input feature map F1, and outputs a feature map F2 of 128*128 to the third layer of backbone network C3. The third layer of backbone network C3 performs feature extraction on the input feature map F2, and outputs a feature map F3 of 64*64 to the fourth layer of backbone network C4, and so on. The size of the feature map output by the upper layer of backbone network is twice that of the feature map output by the next layer of backbone network.

2) Multilayer feature pyramid networks, an input of upper layer of feature pyramid networks is a sum of an output of next layer of feature pyramid networks and an output of the backbone network at the same layer as the upper layer of feature pyramid network.

The Feature Pyramid Networks (FPN) is used to predict the feature map of each layer, which is a bottom-up structure and performs up-sampling processing layer by layer.

Illustratively, as shown in the figure, the input of the fifth layer of feature pyramid network P5 is the input of the backbone network of the same layer as the fifth layer (equivalent to performing a 1×1 convolution). The input of the fourth layer of feature pyramid network P4 is the sum of the output of the fifth layer of feature pyramid network P5 and the output of the backbone network C4 (fourth layer of backbone network) of the same layer as the fourth layer. The input of the third layer of feature pyramid network P3 is the sum of the output of the fourth layer of feature pyramid network P4 and the output of the backbone network C3 (third layer of backbone network) of the same layer as the third layer, and so on.

3) Attention layer.

The Attention Block layer enables the feature extraction capability of the network to focus more on the optic disc area and macular area and reduce the noise introduced by other areas.

4) Pooling layer.

In this layer, RoIAlign operation is performed on the stride corresponding to the feature maps obtained from [P2 P3 P4 P5] and four different scales of attention layer to generate RoI, so as to obtain a proposal feature map with fixed size, which is input to fully connected layer for target detection and location.

5) Full connected layer.

This layer connects (Concat) the proposal feature map output by pooling layer, and then the network is divided into three parts: full-connected prediction class (class), full-connected prediction rectangle box (box), and full-connected prediction confidence score (score).

6) Output layer.

This layer is used to output three values, namely, the class of feature area in fundus image, the detection block of feature area in fundus image and the confidence score of the detection block. The feature area is any one or more of optic disc area and macular area.

In this alternative embodiment, Mask RCNN is improved, and the lightweight Mobile Net V2 network is adopted as the backbone network, which reduces the calculation amount of network parameters and can improve the detection speed of the fundus image detection model. In addition, the attention layer is added after the layer of feature pyramid network, which enables the feature extraction capability of the network focus more on the optic disc area and macular area, thus further improving the detection speed and accuracy of the fundus image detection model.

An acquisition module 303, configured to acquire a detection result of the fundus image detection model, wherein the detection result includes an optic disc area, and a first detection block and a first confidence score corresponding to the optic disc area, and a macular area, and a second detection block and a second confidence score corresponding to the macular area in a fundus image.

The fundus image detection model outputs a fundus image marked with feature area. That is, the output is a fundus image in which the macular area and/or the optic disc area are marked with a detection block.

The confidence score is used to indicate the accuracy of the feature area detected by the fundus image detection model, and the value range is 0-1.

According to the experimental statistics, when using the trained fundus image detection model to process any fundus image, for most of the fundus images, for example, 80%, the fundus image detection model can accurately output the fundus image marked with the optic disc area, that is, it can accurately mark the position of the optic disc area with the detection block, and the obtained confidence score is also high. The macular area may or may not be marked in the output fundus image. However, due to the fact that the macular area is prone to pathological changes or occlusion, the macular area detected by the fundus image detection model may have errors, and the corresponding confidence score may be high or low. If the fundus image output by the fundus image detection model is directly marked with macular area and has high confidence score, it can be directly used as the result. If the fundus image output by the fundus image detection model is marked with macular area but the confidence score is low, or the output fundus image is not marked with macular area, the position of macular area can be corrected according to the position of optic disc area.

It should be noted that the outline of the detection block is rectangular, which is determined by the sample data in the training process of the fundus image detection model. If the shape marked in the sample data is changed during the training process, for example, circular or irregular shapes, the trained fundus image detection model will also be marked with corresponding shapes, thus outputting the outline of corresponding shapes.

A calculation module 304, configured to calculate a center point coordinate of the optic disc area according to the first detection block, and calculate a center point coordinate of the macular area according to the second detection block.

After the fundus image detection model outputs the fundus image marked with feature area, the detection block of the optic disc area and the detection block of the macular area can be obtained from the fundus image marked with feature area.

The XOY coordinate system is established with the upper left corner of the fundus image marked with feature area as the origin, the upper border line as X axis and the left border line as Y axis. And then first coordinates of the vertexes of the detection block of the optic disc area and second coordinates of the vertexes of the detection block of the macular area in the XOY coordinate system are obtained.

The center point coordinate of the optic disc area can be calculated according to a plurality of the first coordinates. And the center point coordinate of the macular area can be calculated according to a plurality of the second coordinates.

For example, assuming that the first coordinates of the vertexes of the detection block of the optic disc area are (a, b),(c,b),(a,d),(c,d), then the center point coordinate of the optic disc area is $$\left(\frac{a+c}{2}, \frac{b+d}{2}\right).$$

Assuming that the second coordinates of the vertexes of the detection block of the macular area are (s,t), (m,t),(s,n), (m,n), then the center point coordinate of the macular area is $$\left(\frac{s+m}{2}, \frac{t+n}{2}\right).$$

A comparison module 305, configured to compare the second confidence score with a preset first confidence threshold and a preset second confidence threshold.

The preset first confidence threshold and the preset second confidence threshold are both critical values preset for judging the accuracy of the detection block of the macular area. The preset first confidence threshold is greater than the preset second confidence threshold.

An identification module 306, configured to, if the second confidence score is less than the preset second confidence threshold, identify whether the to-be-detected fundus image is a left eye fundus image or a right eye fundus image using a pre-trained left and right eye recognition model.

The left and right eye recognition model may be trained in advance offline.

The specific training process is as follows: collecting a plurality of fundus images, marking each fundus image to indicate that the fundus image is a left eye fundus image or a right eye fundus image, taking the fundus images and corresponding marks as a data set, then dividing the data set into a training set and a test set, wherein the number of training sets is greater than the number of test sets, and training deep neural networks such as convolutional neural networks based on the training set to obtain a left and right eye recognition model. And then testing the test pass rate of the trained left and right eye recognition model based on the test set, outputting the left and right eye recognition model when the test pass rate is greater than or equal to the preset pass rate threshold. And redividing the training set and the test set and training the left and right eye recognition model based on the new training set until the test pass rate is greater than or equal to the preset pass rate threshold.

The relative positions of the macular area and optic disc area are different between left eye fundus image and right eye fundus image. In the left eye fundus image, the optic disc area is on the left, the macular area is on the right, and the macular area is on the right side of the optic disc area. In the right eye fundus image, the optic disc area is on the right, the macula area is on the left, and the macula area is on the left side of the optic disc area.

Therefore, when the second confidence score is less than the preset first confidence threshold, it indicates that the confidence score of the macular area detected by the fundus image detection model is very low, or the macular area is not detected. In this case, it needs to further identify whether the to-be-detected fundus image is a left eye fundus image or a right eye fundus image, and then adopt different correction methods to correct the detection block of the macular area, and then correct the center point of the macular area.

A correction module 307, configured to correct a center point of the macular area using different correction models for the left eye fundus image and the right eye fundus image.

The step of correcting a center point of the macular area using different correction models for the left eye fundus image and the right eye fundus image includes:

correcting the center point of the macular area using a first correction model and the center point coordinate of the optic disc area for the left eye fundus image, and the first correction model is as follows:

$$x_{fovea} = \begin{cases} x_{oc} + \sqrt{(2.42*h)^2 - (y_{fovea} - y_{oc})^2}, \text{ others} \\ x_{oc} + 0.39*\left(\frac{W}{2}\right), |x_{fovea} - x_{oc}| < 0.3*W \text{ OR}, \\ |x_{fovea} - x_{oc}| > 0.465*W \end{cases}$$

$$y_{fovea} = 0.3*y_{oc} + 0.7*\left(\frac{H}{2}\right),$$

correcting the center point of the macular area using a second correction model and the center point coordinate of the optic disc area for the right eye fundus image, and the second correction model is as follows:

$$x_{fovea} = \begin{cases} x_{oc} - \sqrt{(2.42*h)^2 - (y_{fovea} - y_{oc})^2}, \text{ others} \\ x_{oc} - 0.39*\left(\frac{W}{2}\right), |x_{fovea} - x_{oc}| < 0.3*W \text{ OR}, \\ |x_{fovea} - x_{oc}| > 0.465*W \end{cases}$$

$$y_{fovea} = 0.3*y_{oc} + 0.7*\left(\frac{H}{2}\right),$$

wherein, W represents a width of the to-be-detected fundus image, H represents a height of the to-be-detected fundus image, ($x_{oc}$, $y_{oc}$) is calculated center point coordinate of the optic disc area, h is a height of the first detection block corresponding to the optic disc area, and ($x_{fovea}$, $y_{fovea}$) is corrected center point coordinate of the macular area.

According to a preferred embodiment of the present application, the correction module 307 is further configured to:

if the second confidence score is less than the preset first confidence threshold and greater than the preset second confidence threshold, correct the center point of the macular area using a third correction model and the center point coordinate of the optic disc area, and the third correction model is as follows:

$x_{fc} = 0.5*x_{dc} + 0.5*x_{fovea}$, $y_{fc} = 0.5*y_{dc} + 0.5*y_{fovea}$, wherein, ($x_{fc}$, $y_{fc}$) is final corrected center point coordinate of the macular area, ($x_{dc}$, $y_{dc}$) is calculated center point coordinate of the macular area, ($x_{fovea}$, $y_{fovea}$) is center point coordinate of the macular area corrected according to the center point coordinate of the optic disc area.

When the second confidence score is between the preset first confidence threshold and the preset second confidence threshold, it indicates that the fundus image detection model has detected the macular area, but the confidence score of the detected macular area is not high, and the accuracy of the detection block of the marked macular area is not high, so it is necessary to correct the detection block of the macular area and further correct the center point of the macular area.

According to a preferred embodiment of the present application, if the second confidence score is greater than the preset first confidence threshold, the device for positioning macular center in fundus images 30 further includes:

a determination module 308, configured to take the center point coordinate of the macular area calculated according to the second detection block as a final center point coordinate of the macular area.

If the macular area is detected by the fundus image detection model, and the confidence score corresponding to the macular area is high (greater than the preset first confidence threshold), it is considered that the macular area detected by the fundus image detection model is good, and there is no need for the fundus image detection model to detect the optic disc area. Only when the fundus image detection model can't detect the macular area, or when the macular area is detected but the confidence score corresponding to the macular area is low (less than the preset first confidence threshold), the macular area needs to be corrected according to the detection result of the optic disc area. Therefore, by adopting the above technical solution, the dependency on the optic disc area can be reduced to a certain extent.

It should be noted that 0.3, 0.7, 2.42, 0.39 and 0.5 in the above formula are obtained through a large number of experimental studies.

To sum up, according to the device for positioning macular center in fundus images, the fundus image detection model is obtained by training based on Mask RCNN network, and detection block of the optic disc area and detection block of the macular area in the to-be-detected fundus image and the confidence score of the corresponding detection block are output by the fundus image detection model. Then the center point coordinates of the optic disc area and the macular area are calculated according to the detection block. And finally, according to the corresponding relationship between the macular area and the optic disc area of the left and right eyes, the optic disc center is used for correcting the fundus image of the undetected macular area and the macular area with low confidence score. Even if the macular area is blocked or the fundus image quality is poor, the center of macular area can still be located effectively. The above solves the problem that the detection of macular area fails due to poor image quality, or the image being blocked by lesions and the like. Furthermore, the fundus image detection model detects the macular area and the optic disc area separately, so that the macular center can still be effectively located even if the optic disc area is missing in the fundus image, thereby breaking away from the dependence of the conventional method for positioning macular center on the optic disc center positioning.

In addition, by changing the structure of Mask RCNN network, the calculation amount of network parameters is reduced, the detection speed of fundus image detection model is improved, and the timeliness of macular center positioning is improved. The attention layer is added after the feature pyramid network, which enables the feature extraction capability of the network focus more on the optic disc area and macular area, further improving the detection speed and accuracy of fundus image detection model, and helping to improve the positioning of macular center.

Embodiment 3

Figure 4:
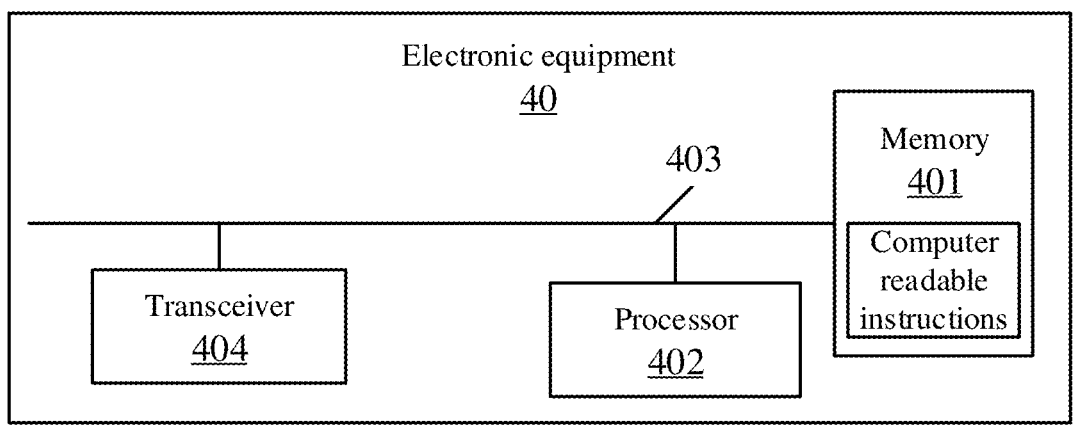
FIG. 4 is a schematic diagram of an electronic equipment according to an embodiment of the present application.

FIG. 4 is a schematic diagram of an electronic equipment according to an embodiment of the present application. The electronic equipment 40 includes a memory 401, a processor 402, a communication bus 403, and a transceiver 404. The memory 401 stores computer readable instructions that can be run on the processor 402, such as a program for positioning macular center in fundus images. When the processor 402 executes the computer readable instructions, the steps in the above embodiment of the method for positioning macular center in fundus images are implemented. That is, the electronic equipment 40 includes a processor 402, and the processor 402 is used for executing the computer readable instructions stored in the memory 401 to realize the steps in the above embodiment of the method for positioning macular center in fundus images.

For example, the computer readable instructions may be divided into one or more modules, and the one or more modules are stored in the memory 401 and executed by the processor 402 to complete the method. The one or more modules may be instruction segments of a series of computer readable instructions capable of performing specific functions, and the instruction segments are used to describe the operation process of the computer readable instructions in the electronic equipment 40. For example, the computer readable instructions may be divided into an input module 301, a training module 302, an acquisition module 303, a calculation module 304, a comparison module 305, an identification module 306, a correction module 307 and a determination module 308 shown in FIG. 3. See embodiment 2 for specific functions of each module.

The electronic equipment 40 may be a desktop computer, a notebook computer, a palm computer, a cloud server or other computing devices. It can be understood by those skilled in the art that the schematic diagram of FIG. 4 is only an example of the electronic equipment 40, and does not constitute a limitation of the electronic equipment 40. It may include more or less components than shown here, or combine with some components or be a different component. For example, the electronic equipment 40 may also include input and output devices, network access devices, buses, etc.

The processor 402 may be a Central Processing Unit (CPU), other general-purpose processors, Digital Signal Processor (DSP), Application Specific Integrated Circuit (ASIC), Field-Programmable Gate Array (FPGA) or other programmable logic devices, discrete gate or transistor logic devices, discrete hardware components, etc. The general-purpose processor may be a microprocessor, or the processor 402 may be any conventional processor, etc. The processor 402 is the control center of the electronic equipment 40, and connects various parts of the entire electronic equipment 40 by various interfaces and lines.

The memory 401 may be used to store the computer readable instructions, and the processor 402 can realize various functions of the electronic equipment 40 by running or executing the computer readable instructions stored in the memory 401 and calling the data stored in the memory 401. The memory 401 may mainly include a program memory area and a data storage area, wherein the program memory area may store an operating system and an application program required by at least one function (such as a sound playing function, an image playing function, etc.), etc. The data storage area may store data created according to the use of the electronic equipment 40 (such as audio data, phone book, etc.), etc. In addition, the memory 401 may include high-speed random access memory, and may also include nonvolatile memory, such as hard disk, memory, plug-in hard disk, Smart Media Card (SMC), Secure Digital (SD) card, Flash Card, at least one magnetic disk memory device, flash memory device, or other nonvolatile solid-state memory devices.

The integrated modules of the electronic equipment 40 may be stored in a computer readable storage medium if they are implemented in the form of software function modules and sold or used as independent products. Based on this understanding, all or part of the steps of the method in the above embodiment may also be completed by instructing related hardware through computer readable instructions, which may be stored in a computer storage medium. And the computer readable instructions, when executed by a processor, may realize the steps of the above method embodiment.

In an embodiment, one or more readable storage medium stored with computer readable instructions are provided, and the computer readable instructions, when executed by one or more processors, cause the one or more processors to execute the steps of the method for positioning macular center in fundus images in the above-described embodiment. The code of the computer readable instructions may be in the form of source code, object code, executable file or some intermediate form, etc. The computer readable medium may include any entity or device capable of carrying the code of the computer readable instructions, recording medium, U disk, removable hard disk, magnetic disk, optical disk, computer memory, Read-Only Memory (ROM), Random Access Memory (RAM), electrical carrier signals, telecommunication signals and software distribution medium, etc. It should be noted that the contents contained in the computer readable medium may be increased or decreased as appropriate according to the requirements of legislation and patent practice in jurisdictions. For example, in some jurisdictions, according to legislation and patent practice, the computer readable medium does not include electrical carrier signals and telecommunication signals. The readable storage medium in this embodiment includes nonvolatile readable storage medium and volatile readable storage medium.

For the embodiments provided in this application, it should be understood that the disclosed system, device and method may be realized in other ways. For example, the device embodiment described above is only an example. For example, the division of the module is only one example of the logical function divisions, and there may be another division mode in real practice.

The modules described as separate components may or may not be physically separated, and the components shown as modules may or may not be physical modules, i.e., they may be located in one place or distributed to several network units. Some or all of the modules may be selected according to actual needs to achieve the purpose of this embodiment.

In addition, each function module in each embodiment of the present application may be integrated into one processing module, or each module may physically exist separately, or two or more modules may be integrated into one module. The above integrated modules may be implemented in the form of hardware, or in the form of combination of hardware and software function modules.

The above integrated modules implemented in the form of software function modules may be stored in a computer readable storage medium. The above-mentioned software function modules are stored in a storage medium, and includes several instructions to enable an electronic equipment (which may be a personal computer, a server, or a network device, etc.) or a processor to execute part of the steps of the method described in the embodiment of the present application.

It is obvious to those skilled in the art that the application is not limited to the details of the above exemplary embodiments, and that the application may be realized in other specific forms without departing from the spirit or basic features of the application. Therefore, the embodiments should be regarded as exemplary rather than restrictive from any point of view, and the scope of the present application is defined by the appended claims instead of the above description. All changes which come within the meaning and range of equivalency of the claims are to be embraced within their scope. No reference signs in the claims should be deemed to limit the invention in scope. In addition, obviously, the term "include" does not exclude other modules or steps. And the singular terms "a", "an" and "the" include plural reference and vice versa unless the context clearly indicates otherwise. A plurality of modules or devices stated in the system claims may also be realized by one module or device through software or hardware. The terms "first" and "second" are used to distinguish different features, rather than indicate any particular order.

Finally, it should be noted that the above embodiments are only used to illustrate the technical solutions of the present application, but not to limit it. Although the application has been described in detail with reference to the preferred embodiments, those of ordinary skill in the art should understand that the technical solutions of the present application may be modified or equivalently replaced without departing from the spirit and scope of the technical solutions of the present application.

What is claimed is:

1. A method for positioning macular center in fundus images, comprising:
inputting a to-be-detected fundus image into a pre-trained fundus image detection model;
acquiring a detection result of the fundus image detection model, wherein the detection result comprises an optic disc area, and a first detection block and a first confidence score corresponding to the optic disc area, and a macular area, and a second detection block and a second confidence score corresponding to the macular area in a fundus image;
calculating a center point coordinate of the optic disc area according to the first detection block, and calculating a center point coordinate of the macular area according to the second detection block;
comparing the second confidence score with a preset first confidence threshold and a preset second confidence threshold, wherein the preset first confidence threshold is greater than the preset second confidence threshold;
if the second confidence score is less than the preset second confidence threshold, identifying whether the to-be-detected fundus image is a left eye fundus image or a right eye fundus image using a pre-trained left and right eye recognition model;
correcting a center point of the macular area using different correction models for the left eye fundus image and the right eye fundus image.

2. The method of claim 1, wherein the step of correcting a center point of the macular area using different correction models for the left eye fundus image and the right eye fundus image comprises:
correcting the center point of the macular area using a first correction model and the center point coordinate of the optic disc area for the left eye fundus image, and the first correction model is as follows:

$$x_{fovea} = \begin{cases} x_{oc} + \sqrt{(2.42*h)^2 - (y_{fovea} - y_{oc})^2}, \text{others} \\ x_{oc} = 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

correcting the center point of the macular area using a second correction model and the center point coordinate of the optic disc area for the right eye fundus image, and the second correction model is as follows:

$$x_{fovea} = \begin{cases} x_{oc} - \sqrt{(2.42*h)^2 - (y_{fovea} - y_{oc})^2}, \text{others} \\ x_{oc} - 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

wherein, W represents a width of the to-be-detected fundus image, H represents a height of the to-be-detected fundus image, ($x_{oc}$, $y_{oc}$) is calculated center point coordinate of the optic disc area, h is a height of the first detection block corresponding to the optic disc area, and ($x_{fovea}$, $y_{fovea}$) is corrected center point coordinate of the macular area.

3. The method of claim 2, comprising:
if the second confidence score is less than the preset first confidence threshold and greater than the preset second confidence threshold, correcting the center point of the macular area using a third correction model and the center point coordinate of the optic disc area, and the third correction model is as follows:

$$x_{fc} = 0.5*x_{dc} + 0.5*x_{fovea},$$

$$y_{fc} = 0.5*y_{ac} + 0.5*y_{fovea},$$

wherein, ($x_{fc}$, $y_{fc}$) is final corrected center point coordinate of the macular area, ($x_{dc}$, $y_{dc}$) is calculated center point coordinate of the macular area, ($x_{fovea}$, $y_{fovea}$) is center point coordinate of the macular area corrected according to the center point coordinate of the optic disc area.

4. The method of claim 1, comprising:
if the second confidence score is greater than the preset first confidence threshold, taking the center point coordinate of the macular area calculated according to the second detection block as a final center point coordinate of the macular area.

5. The method of claim 1, wherein training process of the fundus image detection model comprises:
acquiring a plurality of fundus images;
marking one or more feature areas in each fundus image, wherein the feature areas are macular area and optic disc area;
building a sample data set based on the fundus image marked with one or more feature areas and categories of the corresponding feature areas;
dividing randomly the sample data set into a first number of training sets and a second number of test sets;
inputting the training set into Mask RCNN network for training to obtain a fundus image detection model;
inputting the test set into the fundus image detection model for testing to obtain a test pass rate;
determining whether that test pass rate is greater than a preset pass rate threshold;
if the test pass rate is greater than or equal to the preset pass rate threshold, ending the training of the fundus image detection model; if the test pass rate is less than the preset pass rate threshold, increasing the number of training sets, and training Mask RCNN network based on the increased number of training sets until the test pass rate is greater than or equal to the preset pass rate threshold.

6. The method of claim 5, wherein after acquiring a plurality of fundus images, the method further comprises:
rotating the fundus image at a predetermined angle;

marking one or more feature areas in the fundus image after rotation;

the step of building a sample data set based on the fundus image marked with one or more feature areas and categories of the corresponding feature areas comprises: building a first sample data set based on the fundus image marked with one or more feature areas and categories of the corresponding feature areas, and building a second sample data set based on the rotated fundus image marked with one or more feature areas and categories of the corresponding feature areas; and taking the first sample data set and the second sample data set as the sample data set.

7. The method of claim 5, wherein a network structure of the Mask RCNN network comprises:

multilayer backbone networks, each layer of backbone networks adopts MobileNet V2 network;

multilayer feature pyramid networks, an input of upper layer of feature pyramid networks is a sum of an output of next layer of feature pyramid networks and an output of the backbone network at the same layer as the upper layer of feature pyramid network; and attention layer.

8. An electronic equipment, comprises a processor for executing computer readable instructions stored in a memory to implement following steps:

inputting a to-be-detected fundus image into a pre-trained fundus image detection model;

acquiring a detection result of the fundus image detection model, wherein the detection result comprises an optic disc area, and a first detection block and a first confidence score corresponding to the optic disc area, and a macular area, and a second detection block and a second confidence score corresponding to the macular area in a fundus image;

calculating a center point coordinate of the optic disc area according to the first detection block, and calculating a center point coordinate of the macular area according to the second detection block;

comparing the second confidence score with a preset first confidence threshold and a preset second confidence threshold, wherein the preset first confidence threshold is greater than the preset second confidence threshold;

if the second confidence score is less than the preset second confidence threshold, identifying whether the to-be-detected fundus image is a left eye fundus image or a right eye fundus image using a pre-trained left and right eye recognition model;

correcting a center point of the macular area using different correction models for the left eye fundus image and the right eye fundus image.

9. The electronic equipment of claim 8, wherein the step of correcting a center point of the macular area using different correction models for the left eye fundus image and the right eye fundus image comprises:

correcting the center point of the macular area using a first correction model and the center point coordinate of the optic disc area for the left eye fundus image, and the first correction model is as follows:

$$x_{fovea} = \begin{cases} x_{oc} \sqrt{(2.42*h)^2 - (y_{fovea} - y_{oc})^2}, \text{others} \\ x_{oc} + 0.39*\left(\frac{W}{2}\right), |x_{fovea} - x_{oc}| < 0.3*W \text{ OR}, \\ |x_{fovea} - x_{oc}| > 0.465*W \end{cases}$$

$$y_{fovea} = 0.3*y_{oc} + 0.7*\left(\frac{H}{2}\right),$$

correcting the center point of the macular area using a second correction model and the center point coordinate of the optic disc area for the right eye fundus image, and the second correction model is as follows:

$$x_{fovea} = \begin{cases} x_{oc} - \sqrt{(2.42*h)^2 - (y_{fovea} - y_{oc})^2}, \text{others} \\ x_{oc} - 0.39*\left(\frac{W}{2}\right), |x_{fovea} - x_{oc}| < 0.3*W \text{ OR}, \\ |x_{fovea} - x_{oc}| > 0.465*W \end{cases}$$

$$y_{fovea} = 0.3*y_{oc} + 0.7*\left(\frac{H}{2}\right),$$

wherein, W represents a width of the to-be-detected fundus image, H represents a height of the to-be-detected fundus image, ($x_{oc}$, $y_{oc}$) is calculated center point coordinate of the optic disc area, h is a height of the first detection block corresponding to the optic disc area, and ($x_{fovea}$, $y_{fovea}$) is corrected center point coordinate of the macular area.

10. The electronic equipment of claim 9, wherein the processor is further configured to execute computer readable instructions stored in the memory to implement following steps:

if the second confidence score is less than the preset first confidence threshold and greater than the preset second confidence threshold, correcting the center point of the macular area using a third correction model and the center point coordinate of the optic disc area, and the third correction model is as follows:

$$x_{fc} = 0.5*x_{dc} + 0.5*x_{fovea},$$

$$y_{fc} = 0.5*y_{ac} + 0.5*y_{fovea},$$

wherein, ($x_{fc}$, $y_{fc}$) is final corrected center point coordinate of the macular area, ($x_{dc}$, $y_{dc}$) is calculated center point coordinate of the macular area, ($x_{fovea}$, $y_{fovea}$) is center point coordinate of the macular area corrected according to the center point coordinate of the optic disc area.

11. The electronic equipment of claim 8, wherein training process of the fundus image detection model comprises:

acquiring a plurality of fundus images;

marking one or more feature areas in each fundus image, wherein the feature areas are macular area and optic disc area;

building a sample data set based on the fundus image marked with one or more feature areas and categories of the corresponding feature areas;

dividing randomly the sample data set into a first number of training sets and a second number of test sets;

inputting the training set into Mask RCNN network for training to obtain a fundus image detection model;

inputting the test set into the fundus image detection model for testing to obtain a test pass rate;

determining whether that test pass rate is greater than a preset pass rate threshold;

if the test pass rate is greater than or equal to the preset pass rate threshold, ending the training of the fundus image detection model; if the test pass rate is less than the preset pass rate threshold, increasing the number of training sets, and training Mask RCNN network based on the increased number of training sets until the test pass rate is greater than or equal to the preset pass rate threshold.

12. The electronic equipment of claim 11, wherein after acquiring a plurality of fundus images, the processor is further configured to execute computer readable instructions stored in the memory to implement following steps:
rotating the fundus image at a predetermined angle;
marking one or more feature areas in the fundus image after rotation;
the step of building a sample data set based on the fundus image marked with one or more feature areas and categories of the corresponding feature areas comprises: building a first sample data set based on the fundus image marked with one or more feature areas and categories of the corresponding feature areas, and building a second sample data set based on the rotated fundus image marked with one or more feature areas and categories of the corresponding feature areas; and taking the first sample data set and the second sample data set as the sample data set.

13. The electronic equipment of claim 11, wherein a network structure of the Mask RCNN network comprises:
multilayer backbone networks, each layer of backbone networks adopts MobileNet V2 network;
multilayer feature pyramid networks, an input of upper layer of feature pyramid networks is a sum of an output of next layer of feature pyramid networks and an output of the backbone network at the same layer as the upper layer of feature pyramid network; and
attention layer.

14. One or more non-transitory readable storage mediums storing computer readable instructions, wherein the computer readable instructions, when executed by one or more processors, cause the one or more processors to implement following steps:
inputting a to-be-detected fundus image into a pre-trained fundus image detection model;
acquiring a detection result of the fundus image detection model, wherein the detection result comprises an optic disc area, and a first detection block and a first confidence score corresponding to the optic disc area, and a macular area, and a second detection block and a second confidence score corresponding to the macular area in a fundus image;
calculating a center point coordinate of the optic disc area according to the first detection block, and calculating a center point coordinate of the macular area according to the second detection block;
comparing the second confidence score with a preset first confidence threshold and a preset second confidence threshold, wherein the preset first confidence threshold is greater than the preset second confidence threshold;
if the second confidence score is less than the preset second confidence threshold, identifying whether the to-be-detected fundus image is a left eye fundus image or a right eye fundus image using a pre-trained left and right eye recognition model;
correcting a center point of the macular area using different correction models for the left eye fundus image and the right eye fundus image.

15. The non-transitory readable storage medium of claim 14, wherein the step of correcting a center point of the macular area using different correction models for the left eye fundus image and the right eye fundus image comprises:
correcting the center point of the macular area using a first correction model and the center point coordinate of the optic disc area for the left eye fundus image, and the first correction model is as follows:

$$x_{fovea} = \begin{cases} x_{oc} + \sqrt{(2.42*h)^2 - (y_{fovea} - y_{oc})^2}, \text{ others} \\ x_{oc} + 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

correcting the center point of the macular area using a second correction model and the center point coordinate of the optic disc area for the right eye fundus image, and the second correction model is as follows:

$$x_{fovea} = \begin{cases} x_{oc} - \sqrt{(2.42*h)^2 - (y_{fovea} - y_{oc})^2}, \text{ others} \\ x_{oc} - 0.39*\left(\frac{W}{2}\right), |x_{fovea} - x_{oc}| < 0.3*W \text{ OR} \\ |x_{fovea} - x_{oc}| > 0.465*W \end{cases}$$

$$y_{fovea} = 0.3*y_{oc} + 0.7*\left(\frac{H}{2}\right),$$

wherein, W represents a width of the to-be-detected fundus image, H represents a height of the to-be-detected fundus image, ($x_{oc}$, $y_{oc}$) is calculated center point coordinate of the optic disc area, h is a height of the first detection block corresponding to the optic disc area, and ($x_{fovea}$, $y_{fovea}$) is corrected center point coordinate of the macular area.

16. The non-transitory readable storage medium of claim 15, wherein the computer readable instructions, when executed by one or more processors, cause the one or more processors to further implement following steps:
if the second confidence score is less than the preset first confidence threshold and greater than the preset second confidence threshold, correcting the center point of the macular area using a third correction model and the center point coordinate of the optic disc area, and the third correction model is as follows:

$x_{fc}=0.5*x_{dc}+0.5*x_{fovea}$, $y_{fc}=0.5*y_{ac}+0.5*y_{fovea}$, wherein, ($x_{fc}$, $y_{fc}$) is final corrected center point coordinate of the macular area, ($x_{dc}$, $y_{dc}$) is calculated center point coordinate of the macular area, ($x_{fovea}$, $y_{fovea}$) is center point coordinate of the macular area corrected according to the center point coordinate of the optic disc area.

17. The non-transitory readable storage medium of claim 14, wherein training process of the fundus image detection model comprises:
acquiring a plurality of fundus images;
marking one or more feature areas in each fundus image, wherein the feature areas are macular area and optic disc area;
building a sample data set based on the fundus image marked with one or more feature areas and categories of the corresponding feature areas;
dividing randomly the sample data set into a first number of training sets and a second number of test sets;
inputting the training set into Mask RCNN network for training to obtain a fundus image detection model;

inputting the test set into the fundus image detection model for testing to obtain a test pass rate;

determining whether that test pass rate is greater than a preset pass rate threshold;

if the test pass rate is greater than or equal to the preset pass rate threshold, ending the training of the fundus image detection model; if the test pass rate is less than the preset pass rate threshold, increasing the number of training sets, and training Mask RCNN network based on the increased number of training sets until the test pass rate is greater than or equal to the preset pass rate threshold.

18. The non-transitory readable storage medium of claim 17, wherein after acquiring a plurality of fundus images, the computer readable instructions, when executed by one or more processors, cause the one or more processors to further implement following steps:

rotating the fundus image at a predetermined angle;

marking one or more feature areas in the fundus image after rotation;

the step of building a sample data set based on the fundus image marked with one or more feature areas and categories of the corresponding feature areas comprises: building a first sample data set based on the fundus image marked with one or more feature areas and categories of the corresponding feature areas, and building a second sample data set based on the rotated fundus image marked with one or more feature areas and categories of the corresponding feature areas; and taking the first sample data set and the second sample data set as the sample data set.

19. The non-transitory readable storage medium of claim 17, wherein a network structure of the Mask RCNN network comprises:

multilayer backbone networks, each layer of backbone networks adopts MobileNet V2 network;

multilayer feature pyramid networks, an input of upper layer of feature pyramid networks is a sum of an output of next layer of feature pyramid networks and an output of the backbone network at the same layer as the upper layer of feature pyramid network; and attention layer.

* * * * *